Oct. 7, 1941.  T. K. GREENLEE  2,257,742
AUTOMATIC CONTROL SYSTEM
Filed Dec. 19, 1938

INVENTOR
Theodore K. Greenlee
BY
Parker, Carlson, Pitzner & Hubbard
ATTORNEYS

Patented Oct. 7, 1941

2,257,742

UNITED STATES PATENT OFFICE 2,257,742

AUTOMATIC CONTROL SYSTEM

Theodore K. Greenlee, Rockford, Ill., assignor to Barber-Colman Company, Rockford, Ill., a corporation of Illinois Application December 19, 1938, Serial No. 246,652

11 Claims. (Cl. 236—74)

This invention relates generally to automatic controls for modulating the movements of a regulating member or controlled object to change the position thereof in accordance with changes in a controlling condition detected by a condition responsive device. More particularly, the invention is directed to a control of the so-called proportioning type in which the controlled object automatically assumes different equilibrium positions for different values of the controlling condition at least through a predetermined range of variation of the latter.

The primary object of the invention is to provide a proportioning control of the above character providing for progressive modulation of the controlled object through part of its operating range and uninterrupted movement through another part of said range.

Another object is to provide novel mechanism of simple and reliable character for carrying out the foregoing object.

Other objects and advantages of the invention will become apparent from the following detailed description taken in connection with the accompanying drawing, in which—

Fig. 3 is an enlarged fragmentary perspective view showing a different position of the mechanism for actuating the controlled object.

Figure 1:
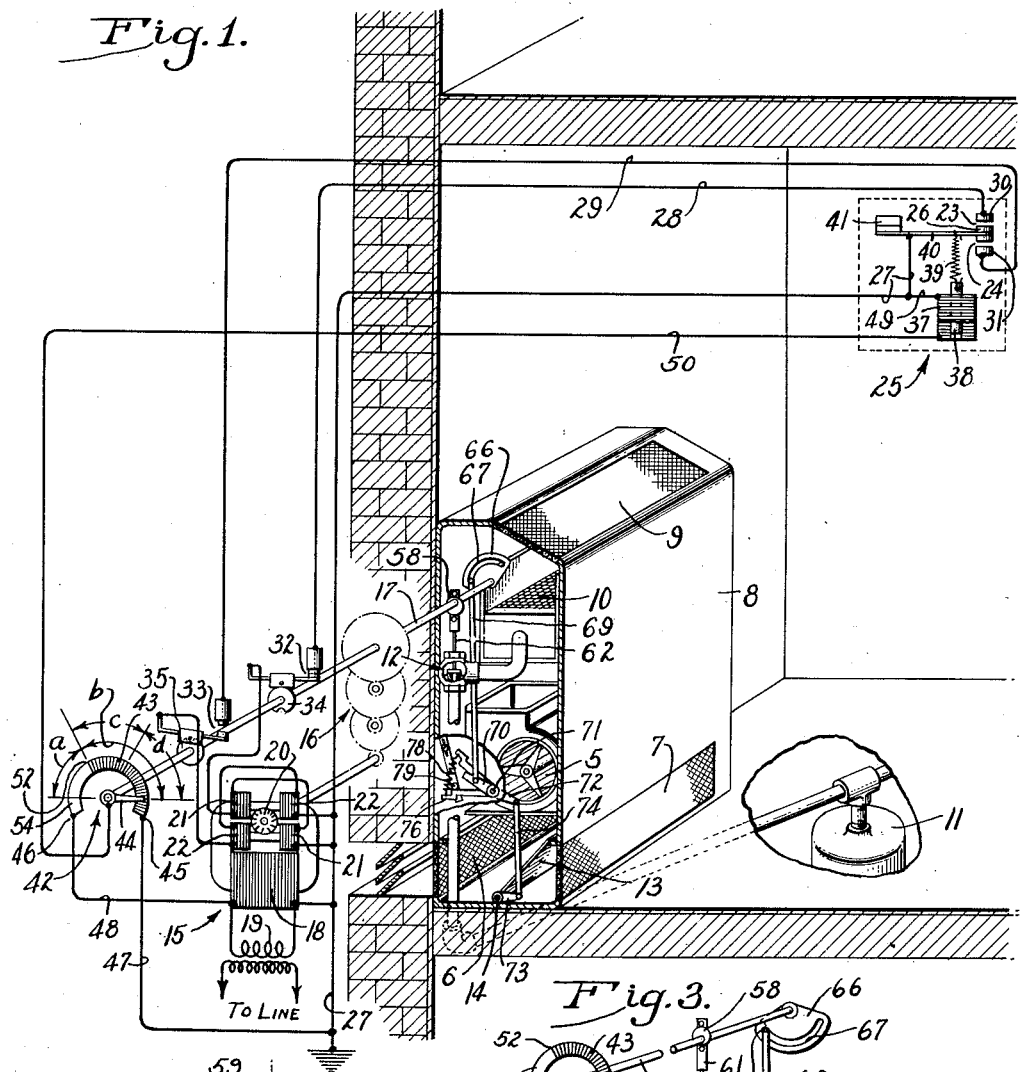
Figure 1 is a schematic view and wiring diagram of one of a variety of condition control systems to which the present invention may be applied.

The invention is applicable to the control of various kinds of regulating devices such as valves, dampers, speed changers, rheostats, etc., for governing various different conditions to be controlled. For convenience of illustration, the invention is shown in the drawing and will be described as applied to the control of a typical system for governing the temperature in the room of a building. I do not intend to limit the invention by such exemplary disclosure but aim to cover all modifications and alternative methods, constructions, and uses falling within the spirit and scope of the invention as expressed in the appended claims.

The temperature exchanging apparatus shown is of the so-called unit ventilator type wherein fresh or recirculated air or a mixture of both drawn by a power driven blower 5 through inlets 6 and 7 in a casing 8 is discharged through the casing outlet 9 into the room or space to be conditioned after passing an exchanger 10 which will be considered as a heater. Conditioning fluid from a source 11 is supplied to the radiator 10 through a control valve 12. The proportion of fresh air in the mixture delivered to the heater 10 is determined by the position of a regulating member in the form of a damper 13 pivoted at 14 and swingable from the full cooling position shown in which the fresh air inlet is fully open and the recirculated air inlet is fully closed to a full heating position (see Fig. 3) in which the fresh air inlet is fully closed. Thus, the conditioning capacity of the apparatus and therefore the temperature of the air delivered to the room will vary with changes in the positions of the valve 12 and the damper 13.

Herein, the valve and the damper are arranged to be oscillated varying distances back and forth through operating connections later to be described and actuated by a reversible electric operator including a motor 15 operating through speed reduction gearing 16 to drive a main operating shaft 17 which may be considered as the controlled member above referred to. Preferably, the motor is of the shaded pole induction type having a winding 18 constantly energized from a low voltage source 19 of alternating current and a rotor 20 arranged to turn clockwise and counter-clockwise respectively according to which of two sets of shading coils 21 and 22 is short-circuited. The rotor remains idle when both sets of coils are open-circuited in which case the position of the valve and damper is maintained by friction.

The invention contemplates moving the controlled member or shaft 17 through a part of its operating range with a so-called proportioning action, that is to say, causing the shaft position to follow progressively the changes in the controlling condition. To this end, the direction and extent of operation of the motor 15 is preferably controlled by switches 23 and 24 actuated selectively by a balanced electromagnetic relay 25, the balanced condition of which is governed by changes in the controlled condition and also the movements of the shaft 17. Herein the common contact 26 of the switches is connected by a conductor 27 to the common terminal of the shading coils 21 and 22, and conductors 28 and 29 extend from the stationary contacts 30 and 31 through limit switches 32 and 33 to the insulated terminals of the coils 21 and 22. The limit switches 32 and 33 are opened by cams 34 and 35 on the shaft 17 in the opposite limits of the operating range of the shaft. Preferably, the contacts 30 and 31 are spaced as close together as is practicable while at the same time maintaining clearance between the cooperating switch contacts in the neutral position of the contact 26 in which both switches are open.

In the present instance, the relay 25 comprises a solenoid 37 continually energized during operation of the control and having a plunger armature 38 which is connected to one end of a light contractile spring 39. The other end of the spring is fastened to a tongue 40 anchored at 41 and carrying the contact 26 at its free end.

The balanced condition of the relay 25 may be controlled in various ways in response to changes in the condition being controlled which, in this instance, is the temperature within a room. For example, the relay may be controlled electrically in a manner well known in the art through the use of a rheostat actuated thermostatically with room temperature changes. It is preferred, however, for the sake of simplicity of construction and greater reliability and sensitivity of operation, to control the relay mechanically, and to this end the tongue 40 is constructed of bimetallic material. The stress in the tongue 40 thus counteracts the pull of the solenoid so that for a given degree of energization of the latter, the contact 26 will remain in neutral position at a predetermined ambient temperature value, will move upwardly to close the switch 23 by warping of the element upon a temperature fall below such value, and will move to close the switch 24 when the temperature rises above the equilibrium value. The element 40, the switches 23 and 24, and the solenoid thus constitute a thermostat, the effective control point of which may be varied manually in the usual way (not shown) to change the value of the controlled temperature which is maintained in the space being conditioned.

Energization of the relay winding 37 is changed automatically with the movement of the controlled object which results from upsetting of the relay balance by the condition responsive element 40, and such change is in a direction to restore the relay balance. It is effected by a rheostat 42 having a wiper arm 44 fast on the shaft 17 and movable across a resistance element 43. Opposite terminals 45 and 46 are connected to the current source 19 by conductors 47 and 48, the former also being connected to the conductor 27 which through a conductor 49 leads to one terminal of the solenoid 37. The other terminal of the solenoid is joined by a conductor 50 to the rheostat arm 44. With this arrangement, the degree of energization of the solenoid will, at any time, be determined by the voltage drop between the wiper arm 44 and the terminal 45. Accordingly, as the shaft 17 turns in a clockwise direction, as it will in response to closure of the switch 24 resulting from a rise in temperature above the prevailing balanced value, the solenoid voltage will decrease thereby decreasing the tension on the spring 39 and permitting the thermostatic element to maintain the relay balance at a higher ambient temperature. Operation of the motor 15 will be continued by the switch 24 until the resulting decrease in the pull of the solenoid just balances the changed stress in the thermostatic tongue at the new ambient temperature.

Conversely, during reverse operation of the motor 15 in response to closure of the thermostat switch 23 by a fall in the ambient temperature below the equilibrium value, the shaft 17 will turn counter-clockwise and the voltage impressed on the solenoid will increase progressively causing a greater solenoid pull to be exerted. As a result, equilibrium of the solenoid pull and stress of the element 40 will be established at a lower controlling temperature. As a result of this proportioning action, the shaft 17 will move back and forth with changes in the ambient temperature and will assume an infinite number of different positions each corresponding to a predetermined temperature of the thermostatic element.

The portion of the operating range of the shaft 17 over which the proportioning action occurs is controlled by the position and length of the resistance element 43. In the present instance, such portion includes the arc b and extends from the limit position of the wiper arm 44 shown in Fig. 1 to the opposite end 52 of the element. Through the remainder of its operating range comprising the arc a between the end 52 and the shaft position shown in Fig. 3 at which the limit switch 32 is opened, the shaft 17 is, in accordance with the present invention, moved by the motor 15 with an uninterrupted or positive action. To this end, provision is made for maintaining the energization of the magnetic relay 25 substantially constant while the shaft is traversing such remaining portion of its range. While this may be accomplished in various ways, it is preferred for the sake of simplicity of rheostat construction and its actuating mechanism to employ a blank contact segment 54 adapted for engagement by the wiper arm 44 in the counterclockwise movement of the latter beyond the end 52 of the resistance element. As the arm traverses this segment, the solenoid voltage remains at a constant maximum determined by the full length of the resistance element, and this even though the temperature of the thermostatic element does not change.

As the temperature falls below the value at which the wiper arm is positioned at the point 52, the switch 23 becomes closed causing operation of the motor 15 to turn the shaft 17 counterclockwise and move the arm onto the segment 54. Since no increase in the solenoid pull results to balance the relay, operation of the motor continues uninterruptedly and irrespective of the degree of such fall in temperature until the shaft reaches the limit positions at which the switch 32 is opened. Assume now that the temperature rises slightly above the value above referred to corresponding to the point 52 of the wiper arm as a result of an increased supply of heat to the room. The switch 24 becomes closed initiating clockwise turning of the shaft 17. This movement continues uninterruptedly until the arm 44 has passed across the full length of the segment 54 and past the point 52 at which the proportioning action begins to occur. Then, the rheostat becomes effective to decrease the solenoid pull and balance the relay at a position of the shaft corresponding to the assumed temperature value.

From the foregoing, it will be seen that the arm 44 and therefore the regulating device or devices actuated from the shaft 17 will move uninterruptedly through the arc a, the movement being counter-clockwise in response to changes in the controlling condition below a value corresponding to the point 52 and clockwise when the condition rises above such value. At controlling conditions above such value, the shaft will oscillate the arm 44 back and forth so that the arm will follow such changes accurately.

By changing the relative positions of the blank segment and the resistance element, it will be apparent that the proportioning and positive actions may be made to occur in any desired parts of the operating range of the shaft 17. Similarly, the relative lengths of such portions will correspond to the lengths of the blank and resistance segments. If desired, more than one blank segment may be provided to produce uninterrupted movements of the controlled member through any desired number of different spaced parts of the operating range, the member being modulated with a proportioning action through the remaining parts of the range.

The uninterrupted and proportioning movements of the operating shaft 17 may be imparted to one or more conditioning regulating members to control the conditioning capacity of a regulating apparatus in any desired manner. In the present instance, the valve 12 and the damper 13 are actuated in a sequence suited to the unit ventilator type of conditioner which is shown. Generally stated, the arrangement is such that the damper is oscillated between closed position (Fig. 3) and a position opening the fresh air outlet to a desired minimum degree during movement of the shaft 17 to turn the arm 44 through the range $a$. The valve 12 is moved between fully open and closed positions as the arm moves through the adjacent portion $c$ of the operating range, and the damper is further opened during oscillation of the shaft within the remaining portion $d$ of the range $b$.

Figure 2:
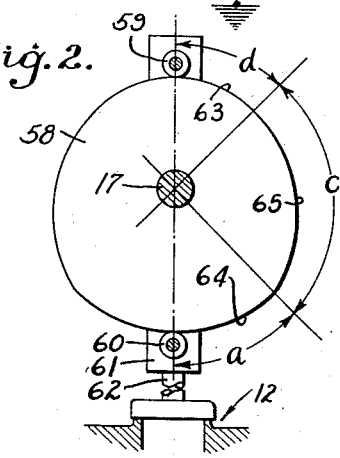
Fig. 2 is a fragmentary cross-sectional view illustrating an actuating arm.

The valve 12 is actuated by a cam 58 fast on the shaft 17 and engaged by rollers 59 and 60 of a follower 61 on the valve stem 62. As shown in Fig. 2, the cam has dwell surfaces 63 and 64 which are active over the portions $d$ and $a$ of the operating range and a surface 65 shaped to move the valve between open and closed positions during counter-clockwise movement through the range $c$.

Fast on the shaft 17 is a segment 66 having a slot 67 therein receiving a pin 68 on a link 69 which at its lower end is connected to a crank 70 fast on a shaft 71. The latter is connected by cranks 72 and 73 and a link 74 to the shaft of the damper 13. The crank 70 has an arm 75 disposed between two arms 76 and 77 loose on the shaft 71 and urged toward each other by a contractile spring 78. Both of the latter arms are engageable with a stop 79 which is normally fixed but which is adjustable to vary the minimum or partially open position of the fresh air damper.

If the parts are in the full cooling positions shown in Figs. 1 and 2 and there is a call for heat by the room thermostat as evidenced by closure of the switch 23, the motor will start in a direction to turn the shaft 17 counter-clockwise. In this motion, the pin 68 remains at the end of the slot 67 permitting the damper to be moved by the spring 78 and follow the arm 75 thereby admitting recirculated air and reducing the amount of fresh air. The extent of such movement corresponds to the extent of the temperature fall. If the fall is sufficient to move the shaft through and beyond the range $d$, the arm 77 will engage the stop 79 to interrupt the movement of the damper at the time the cam surface 65 becomes active to initiate opening of the steam valve 12 supplying heat to the air delivered to the room. As the temperature falls still further, the steam valve continues to open becoming fully opened at the end of the arc $c$. During modulation of the heating capacity of the unit ventilator, the damper remains in the position determined by the stop at which the minimum amount of fresh air desired for ventilating purposes is admitted.

At the ambient temperature at which the arm 44 is disposed at the point 52, the valve 12 will be fully open and lost motion between the segment 66 and the link 69 will have been taken up. On further temperature drop or by manual adjustment of the thermostat to raise its control point, the arm 44 will engage the blank segment 54 causing uninterrupted movement of the shaft to the position shown in Fig. 3. During this, the arm 70 is moved positively in a downward direction moving the damper against the action of the spring 78 on the arm 76 until it reaches a position fully closing the fresh air inlet, the valve 12 remaining open.

In response to lowering of the thermostat control point or upon a substantial rise in the ambient temperature, the damper and valve will be operated in a sequence just the reverse of that above described. Thus, the damper would first be opened to minimum position by the action of the spring 78 on the arms 76 and 75 as permitted by clockwise movement of the segment 66 from the position shown in Fig. 3. Further movement of the shaft after the arm 76 encounters the stop 79 initiates closing of the valve 12 with a proportioning action. Finally, upon a temperature rise above the values corresponding to the range $c$, the segment 66 will again become effective to move the damper toward and away from its full cooling position (Fig. 1).

I claim as my invention:

1. A condition control system having, in combination, a condition responsive instrument having an element movable in opposite directions in response to opposite changes in the condition being controlled, a condition controlling member, a power operator for moving said member through a predetermined operating range, circuits controlled by said element and controlling said operator, an electrical device associated with said element and variably operable according to its degree of energization to determine the effective control point of said instrument, a rheostat actuated in unison with the movements of said member and variably controlling the energization of said device through a portion of said operating range, and means associated with said rheostat and acting to maintain the energization of said device substantially fixed through another portion of said range.

2. A condition control system having, in combination, a condition responsive instrument having an element movable in opposite directions in response to deviation of the condition being controlled from the control point of the instrument, a condition controlling member modulated by said instrument and movable through a given range, an electrical device associated with said instrument and variably operable according to its degree of energization to determine the effective control point of said instrument, means operable automatically to modulate the energization of said device progressively with the movements of said member through a part of said range, and means associated with said last mentioned means and operating to maintain a substantially constant energization of the device during movement of the member through another part of the range.

3. A condition control system having, in combination, a condition responsive instrument having an element movable in opposite directions with opposite changes in a condition being controlled, a condition controlling member movable through a given operating range, a power driven operator for said member, a rheostat having a resistance element and a segmental contact arranged in series relation and a contact arm engageable successively with said element and said contact in the movement of said member through said range, and means controlled by said instrument and said rheostat and controlling said operator to change the position of said member in proportion to condition changes of said instrument during engagement of said arm and said resistance element and to change the position of the member uninterruptedly by a predetermined amount when said arm encounters said contact.

4. A condition control system having, in combination, a condition controlling member, a reversible power operator therefor, two switches controlling the direction and extent of operation of said operator, electromagnetic means for actuating said switches selectively, a condition responsive instrument coacting with said electromagnetic means to control the operation of said switches in accordance with condition changes in a medium to be controlled, a rheostat controlling the degree of energization of said electromagnetic means and actuated in unison with said member to modulate such energization progressively during oscillation of said member within a predetermined range, and means acting automatically to maintain the energization of said electromagnetic means constant during movement of said member through a different range.

5. A condition control system having, in combination, a condition controlling member, a reversible power operator therefor, a control instrument having an element movable in opposite directions with changes in a condition to be controlled and controlling said operator to initiate movement of said member selectively in one direction or the other, electromagnetic means cooperating with said instrument to determine the duration of each movement of the member, means actuated in unison with said member to modulate the energization of said electromagnetic means progressively during oscillation of said member within a predetermined portion of said range, and means responsive to the movements of said member and operating to maintain the energization of said electromagnetic means substantially constant during movement of the member through a different portion of the range.

6. A condition control system having, in combination, a condition controlling member, a reversible power operator therefor, a condition responsive instrument having an element movable in opposite directions with changes in a condition to be controlled and controlling said operator to initiate movement of said member selectively in one direction or the other, means actuated in unison with the movements of said member and cooperating with said instrument to cause the member to follow progressively the condition changes detected by said instrument within a predetermined condition range, and means responsive to the movement of said member and operating when the condition varies beyond one end of said range to cause movement of the member uninterruptedly through a predetermined distance.

7. A condition control system having, in combination, a controlled member, a reversible electric power operator for actuating said member through a predetermined operating range, a normally balanced relay controlling the direction and extent of operation of said operator, a condition responsive device influencing said relay to upset the normal balance thereof in opposite directions in response to opposite condition changes, a balancing voltage regulator controlling the energization of said relay, mechanism actuating said balancing regulator in unison with the movements of said member to modulate the energization of said relay through a predetermined portion of said operating range and in a direction to restore the balance of the relay, and means rendered operative in response to movements of said member and operating to maintain a substantially fixed energization of the relay during movement of said member through a different portion of said range.

8. A condition control system having, in combination, a controlled member, a reversible electric power operator for actuating said member at a substantially constant speed through a predetermined operating range, a condition responsive device for detecting progressive condition variations within a predetermined range, mechanism actuated in unison with said member and coacting with said device in controlling said operator to proportion the movements of said member within a predetermined portion of said operating range accurately and progressively in accordance with condition variations within said condition range, and means operating in response to a condition deviation beyond said condition range to cause uninterrupted movement of the member through another portion of said operating range irrespective of the degree of such deviation.

9. A condition control system having, in combination, a condition controlling member, a reversible electric power operator for actuating said member through a predetermined operating range, a condition responsive device for detecting progressive condition variations within a predetermined condition range, mechanism coacting with said device to control said operator and cause said member to assume different positions within said operating range corresponding to condition values within said condition range, means coacting with said device in response to a condition deviation beyond said condition range to cause uninterrupted movement of the member through another portion of said operating range irrespective of the degree of such deviation, and means subsequently coacting with said device in response to a subsequent reverse condition change into said condition range to cause uninterrupted reverse movement of the member through said last mentioned portion of the operating range.

10. A condition control system having, in combination, a controlled member, a reversible electric power operator for actuating said member through a predetermined operating range, a condition responsive device for detecting progressive condition variations, mechanism coacting with said device to control said operator to cause uninterrupted movement of said member through a part of said range and to proportion the movements of the member within another part of the range to correspond to said condition variations of said device, and a plurality of condition control regulators successively actuated by said member during movement thereof through said range, one of said regulators being actuated during said uninterrupted movement.

11. A condition control system having, in combination, a controlled member, a reversible electric power operator for actuating said member through a predetermined operating range, a condition responsive device for detecting progressive condition variations, mechanism coacting with said device to control said operator to cause uninterrupted movement of said member through a part of said range and to proportion the movements of the member within another part of the range to correspond to said condition variations, and a plurality of condition control regulators operatively connected to said member, one being actuated during said uninterrupted part of said range and two being actuated successively in the proportioning movement of said member through said other part of said range.

THEODORE K. GREENLEE.